United States Patent Office 3,611,745
Patented Oct. 12, 1971

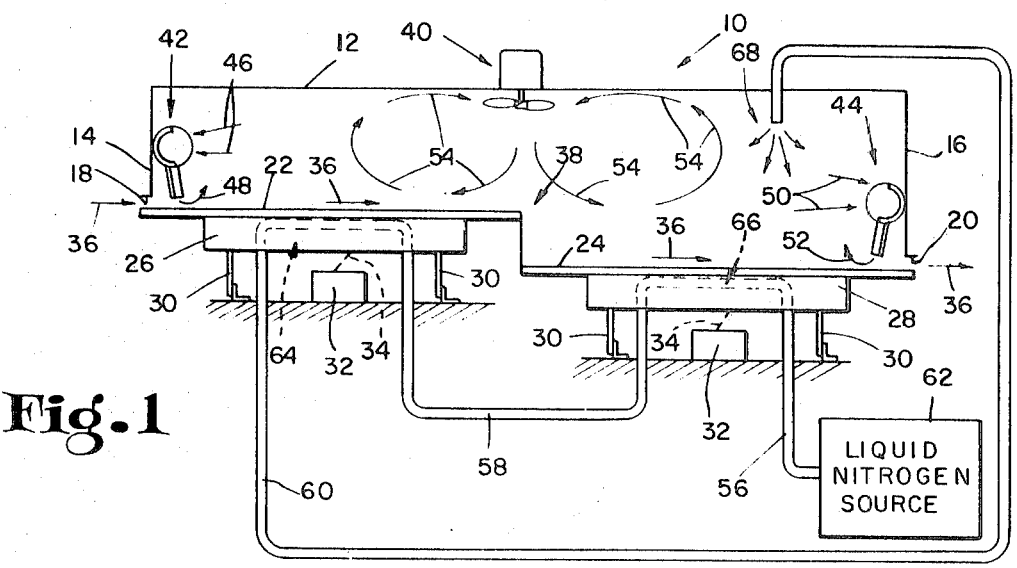
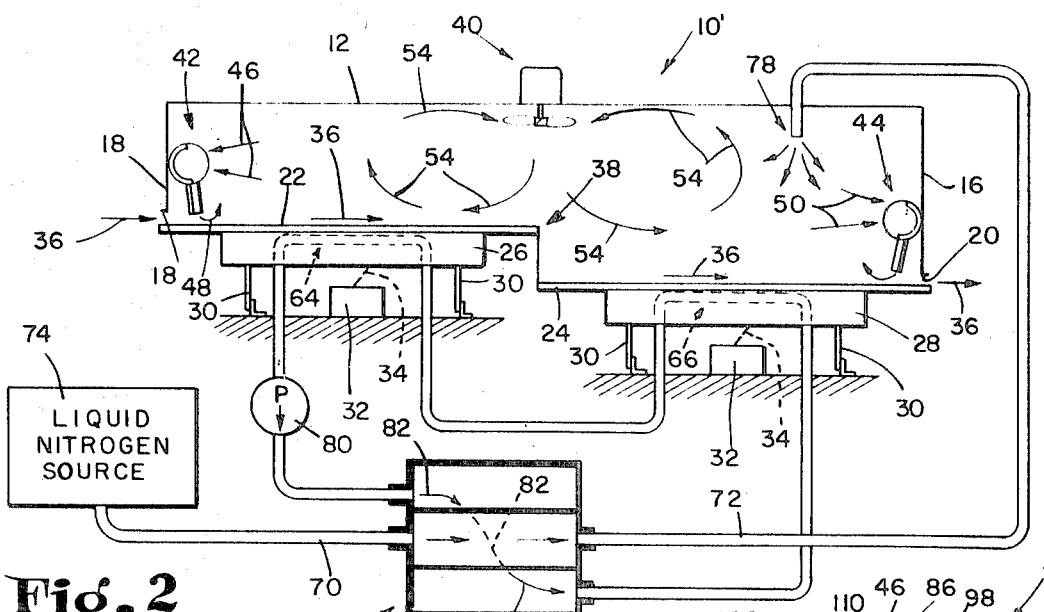
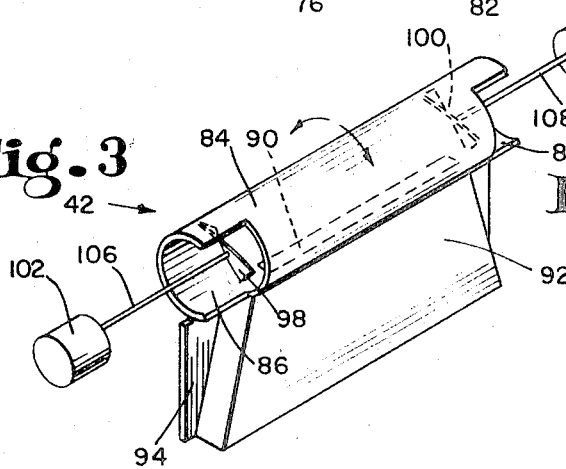
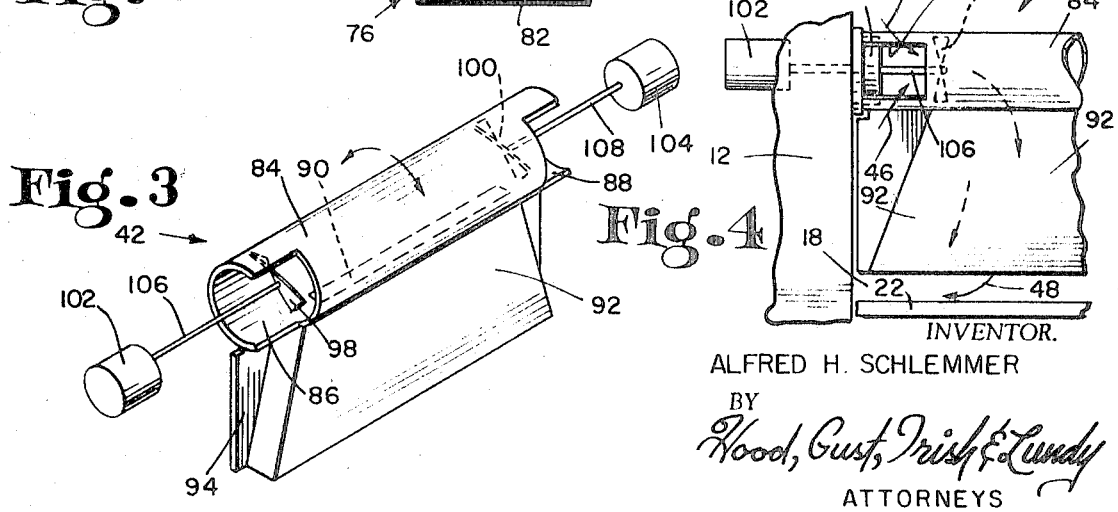

3,611,745
FREEZING SYSTEM
Alfred H. Schlemmer, Indianapolis, Ind., assignor to
Ralph Hamill, Indianapolis, Ind.
Filed Nov. 24, 1969, Ser. No. 879,176
Int. Cl. F25d 17/00
U.S. Cl. 62—333
12 Claims

ABSTRACT OF THE DISCLOSURE

A freezing system comprising means providing a chamber, a plate for supporting articles to be frozen disposed in the chamber, means for lowering the temperature of the plate, first conduit means for connecting the chamber to a source of refrigerant, such as liquid nitrogen, and means for circulating such a refrigerant in said chamber and about the articles supported on the plate. In the preferred embodiment, the means for lowering the temperature of the plate includes a closed-circuit refrigeration system having passageways disposed in heat-conducting relationship to the plate and additional passageways, and a heat exchanger disposed in heat-conducting relationship to the said additional passageways. The heat exchanger is provided with an input port and an exit port, and the said first conduit means includes means for connecting the input port to such a refrigerant source and the exit port to the chamber, whereby the refrigerant to be exhausted into the chamber is first circulated through the heat exchanger in heat-conducting relationship to the said additional passageways of the closed circuit refrigeration system.

---

It is an object of my invention to provide a system ideally suited for rapidly freezing food products in an atmosphere which is controlled by the circulation of a refrigerant vapor therein to prevent oxidation of the food products. It is within my concept to use a liquid nitrogen source of refrigerant and to arrange my system so that nitrogen vapor is exhausted into a chamber in which the food products are frozen. It will be appreciated that a liquid nitrogen system will subject the food products to temperatures as low as, for instance, −50° F. This extremely low temperature is ideally suited for freezing food products, such as fruits and vegetables, having a high moisture or water content. The reason for this is that the extremely low temperature tends to freeze the water in very small crystals which will not greatly expand to rupture the cells or cellular structure of the food product.

It is my concept to exhaust a refrigerant, such as nitrogen, into the chamber in which the food product is frozen to control the environment in the chamber and particularly to prevent oxidizing of the food product. In one embodiment of my invention, I conduct liquid nitrogen directly from a liquid nitrogen source through passageways disposed in heat-conducting relationship to a plate on which the food product is supported, thereby to lower the temperature of the plate and the food product to the desired level, and then exhaust the nitrogen from the passageways into the chamber in which the plate is disposed. Within this chamber, I provide means for recirculating the nitrogen vapor. In another embodiment of my invention, I provide a closed-circuit refrigeration system including passageways disposed in heat-conducting relationship to the plate on which the food product is supported and additional passageways disposed in heat-conducting relationship to a heat exchanger. I also provide a recirculating pump for pumping the refrigerant of the closed-circuit system from the passageways disposed in heat-conducting relationship to the plate to the said additional passageways disposed in the heat exchanger. Then, I circulate a refrigerant, such as liquid nitrogen, through the heat exchanger and in heat-conducting relationship to the said additional passageways and then on into the chamber in which the food product is disposed. By this system, I can keep the temperature of the refrigerant, such as liquid nitrogen, circulating in heat-conducting relationship to the plate at the desired low level and, at the same time, use the heat which is absorbed from the plate by the refrigerant in the closed-circuit system to evaporate the refrigerant which is directed into the chamber.

Another object of my invention is to provide, for use in recirculating the refrigerant vapor exhausted into the freezing chamber, novel blower means which continually recirculates the vapor about the food product and the plate on which it is supported.

Other objects and features of my invention will become apparent as this description progresses.

In the drawings:

FIG. 1 is a diagrammatical view of one embodiment of my invention;

FIG. 2 is a diagrammatical view of another embodiment of my invention;

FIG. 3 is a perspective view of one preferred means for recirculating the refrigerant vapor; and FIG. 4 is a fragmentary view showing the manner in which the means of FIG. 3 is mounted in the freezing chamber.

Referring now particularly to the drawings, it will be seen that I have illustrated my system 10, 10′ as comprising a chamber 12 which is preferably a tunnel-like enclosure having an entry end 14 and an exit end 16, the chamber providing an entry opening 18 in the entry end 14 and an exit opening 20 in the exit end 16. The manner in which this chamber 12 is formed is not a part of this invention and need not be discussed, in detail, in this description. It will suffice to say that it is a well insulated tunnel-like enclosure.

My illustrative system 10, 10′ includes a pair of freeze plates 22, 24 disposed in the chamber 12 and arranged to support articles thereon as they move through the chamber. The plate 22 is disposed adjacent the entry end 14 of the chamber 12 and the plate 24 is disposed adjacent the exit end 16 of the chamber. Each plate 22, 24, is supported on a support member 26, 28 which is, in turn, resiliently supported by means of leaf springs 30. Further, in the illustrative embodiment, a vibratory motor 32 is drivingly connected to each support member 26, 28 as indicated at 34. Each freeze plate 22, 24 and the means by which it is supported constitutes an in-line conveyor of a conventional type. Specifically, when the motors 32 are energized, items entering the opening 18 are conveyed by the plates 22, 24 as indicated by the arrows 36 through the chamber 12 and out the exit opening 20. The right-hand end of the plate 22 (FIGS. 1 and 2) is disposed above the left-hand end of the plate 24 to provide an exchange point 38 between the plates. Thus, as a flat patty-like product moves to the right-hand end of the plate 22 and falls from that end onto the plate 24, it will be flipped over so that both of its sides will be exposed to the plate surfaces and vapors within the chamber by substantially equal amounts.

I show a motor-driven fan 40 disposed near the center of the chamber 12 and a vapor circulator 42, 44 disposed at each end of the chamber. The vapor circulator 42 draws vapor from the upper portion of the chamber 12 as indicated by the arrows 46 and exhausts that vapor downwardly toward the plate and inwardly toward the center of the chamber as indicated by the arrow 48 while the circulator 44 draws vapor from the chamber as indicated by the arrows 50 and exhausts that vapor downwardly toward the plate 24 and inwardly toward the center of the chamber as indicated by the arrow 52. The fan 40 provides vapor circulation as indicated by the arrows 54.

In the system 10 of FIG. 1, there is a first conduit means including conduit sections 56, 58, 60 connecting a liquid nitrogen source 62 to the chamber 12. Specifically, in the illustrative embodiment of FIG. 1, these conduit sections 56, 58, 60 convey nitrogen from the source 62 to passageways 64 disposed in heat-conducting relationship to the freeze plate 22 and passageways 66 disposed in heat-conducting relationship to the freeze plate 24 and through these passageways into the chamber 12 as indicated at 68. The nitrogen exhausted into the chamber 12 as indicated at 68 is in vapor form as a result of having passed through the passageways 64, 66 which are in heat-conducting relationship to the freeze plates 22, 24. The recirculation of this nitrogen vapor within the chamber 12 during the freezing process, of course, reduces the amount of oxygen in the chamber, thereby to prevent oxidation of the surfaces of the food products.

The system 10' of FIG. 2 also ncludes first conduit means including conduit sections 70, 72, for connecting a liquid nitrogen source 74 to the chamber 12. It will be seen that the section 70 connects the source 74 directly to the input port of a heat exchanger 76 and the section 72 connects the exit port of that heat exchanger directly to the chamber 12 to exhaust nitrogen vapors therein as indicated at 78. The heat necessary for vaporizing the liquid nitrogen from the source 74 in the heat exchanger 76 is provided by a closed-circuit refrigeration system including the passageways 64, 66, recirculating pump 80 and the heat exchanger 76. This closed-circuit refrigeration system preferably uses liquid nitrogen as a refrigerant, the refrigerant being pumped by the pump 80 continually through the passageways 64, 66 and the heat exchanger 76 as indicated by the arrows 82. In the heat exchanger 76, the heat absorbed by the nitrogen as it flows through the passageways 64, 66 is utilized to vaporize the liquid nitrogen flowing from the source 74 through the conduit sections 70, 72 into the chamber 12. The pump 80, of course, may be conventionally mechanically driven by means such as an electric motor. The advantage of the system 10' of FIG. 2 is that the temperature of the liquid nitrogen flowing through the passages 64, 66 is maintained at its lowest level thereby to keep the freeze plates 22, 24 at the desired low temperature of, for instance, −50° F.

Preferably, the vapor recirculators 42, 44, which also act as vapor curtains at the ends of the chamber 12, will be identical. Thus, a description of the circulator 42 will suffice as a description for both circulators 42, 44. Referring to FIGS. 3 and 4, it will be seen that the circulator 42 is essentially an electrically-driven blower means comprising a transversely extending housing including a cylindrical housing section 84 having an inlet opening 86, 88 at each of its ends and a transversely extending (or axially extending with respect to the section 84) exhaust opening 90. The housing also provides a transversely elongated duct 92 extending downwardly from the exhaust opening 90, one wall of this duct providing a vapor curtain 94 at the end 14 of the chamber 12.

In the illustrative embodiment, I place a fan blade 98, 100 adjacent each intake opening 86, 88 in the housing section 84 and connect this blade to a motor 102, 104 by means of an elongated plastic shaft 106, 108. While it is not illustrated, it will be appreciated that I may provide means for journal mounting each blade 98, 100 for rotation within the cylindrical housing section 84. The reason for the long plastic shafts 106, 108 is to keep the heat producing motors 102, 104 at a distance and insulated from the interior of the chamber 12.

The transversely elongated exhaust opening 90 of the housing section 84 is disposed between the motor-driven fan blades 98, 100. Thus, each fan blade 98, 100 serves to draw vapor into its adjacent opening 86, 88 and to force this vapor through the exhaust opening 90. In order to control the environment within the chamber 12 and specifically the circulation of the vapor therein, I mount each vapor circulator 42, 44 for selectively adjustable movement about the axis of its cylindrical housing section 84. One means by which this may be done is illustrated in FIG. 4. In FIG. 4 there is illustrated an arbor 110 which extends into the housing section 84 of the vapor circulator 42 so that the section 84 and duct 92 can be pivoted about the arbor. It will be appreciated that there may be such an arbor 110 at each end of each vapor circulator 42, 44. The wall member 94 of each vapor circulator 42, 44 is, of course, adjustable with the housing section 84 from which it depends to provide an adjustable vapor curtain at each end of the chamber 12.

While I have shown the passageways 64, 66 disposed just below the bottom surface of the plates 22, 24, it will be appreciated that this showing is merely illustrative. There are commercially available freeze plates having passageways through which refrigerant can flow formed integrally therein and I may use one of these plates as my plates 22, 24. Further, the showing of the vibratory in-line feeder or conveyor on which each plate 22, 24 is mounted is likewise illustrative. There are several different types of vibratory feeders on which I may mount freeze plates. While I have shown two freeze plates 22, 24, it will be appraciated that in my system 10, 10' I may use any number of freeze plates and any number of in-line feeders for supporting the freeze plates.

While I have found that the illustrated vapor circulators 42, 44 are very suitable for the purpose intended, it will be appreciated that other types of blowers and circulators may be used within the scope of my invention.

What is claimed is:

1. A freezing system comprising means providing a chamber, a plate for supporting articles to be frozen, said plate being disposed in said chamber, means for lowering the temperature of said plate, first conduit means for connecting said chamber to a source of refrigerant, and blower means for circulating and recirculating gases of such refrigerant in said chamber and about such articles supported on said plate, said means for lowering the temperature of said plate including means defining a passageway disposed in direct heat conducting relationship to said plate, said passageway having an input port and an exhaust port, said first conduit means including means for connecting said input port to such a refrigerant source and said exhaust port to said chamber, whereby the refrigerant to be exhausted into said chamber is initially circulated through said passageway and means for vibrating said plate to move such articles therealong.

2. The freezing system of claim 1 in which said chamber is a tunnel-like enclosure having an entry opening in one end and an exit opening in the opposite end, said plate and said means for vibrating said plate being effective to convey such articles entering said entry opening toward said exit opening.

3. The freezing system of claim 2 in which said blower means includes a blower disposed near each end of said enclosure and arranged to direct such refrigerant toward said plate.

4. A freezing system comprising means providing a chamber, a plate for supporting articles to be frozen, said plate being disposed in said chamber, means for lowering the temperature of said plate, first conduit means for connecting said chamber to a source of refrigerant, and means for circulating such refrigerant in said chamber and about such articles supported on said plate, said means for lowering the temperature of said plate including a closed-circuit refrigeration system having passageways disposed in heat-conducting relationship to said plate and additional passageways, a heat exchanger disposed in heat-conducting relationship to said additional passageways, said heat exchanger having an input port and an exit port, and said first conduit means including means for connecting said input port to such a refrigerant source and said exit port to said chamber whereby the refrigerant to be exhausted into said chamber is circulated through said heat exchanger and in heat-conducting relationship to said additional passageways.

5. The freezing system of claim 4 in which said closed-circuit refrigeration system includes a recirculating pump for pumping refrigerant from said passageways disposed in heat-conducting relationship to said plate to said additional passageways.

6. The freezing system of claim 4 in which the refrigerant in said closed-circuit refrigeration system is nitrogen and in which the refrigerant circulated through said heat exchanger and then into said chamber is nitrogen.

7. The freezing system of claim 4 in which said chamber is a tunnel-like enclosure having an entry opening in one end and an exit opening in the opposite end, and in which said circulating means includes blower means disposed near each end of said enclosure and arranged to direct such refrigerant which is present in said enclosure toward said plate.

8. The freezing system of claim 7 in which each blower means includes a housing extending transversely across said enclosure, said housing providing at least one input opening and an exhaust opening, and motor driven fan means for drawing refrigerant into said input opening and forcing it out through said exhaust opening.

9. The freezing system of claim 8 in which said exhaust opening extends transversely across said housing, and in which said housing further provides a transversely elongated duct extending downwardly from said exhaust opening toward said plate, and including means for mounting said housing for selectively adjustable movement in said enclosure, whereby the circulation of refrigerant in said enclosure can be controlled.

10. The freezing system of claim 9 in which said housing is cylindrical and provides one of said input openings at each end thereof, in which said motor driven fan means includes a fan disposed adjacent each said input opening, in which said exhaust opening is disposed to extend axially between said fans, and in which said mounting means provides for selectively adjustable movement about the axis of said housing.

11. The freezing system of claim 10 in which said closed-circuit refrigeration system includes a recirculating pump for pumping refrigerant from said passageways disposed in heat-conducting relationship to said plate to said additional passageways.

12. The freezing system of claim 11 in which the refrigerant in said closed-circuit refrigeration system is nitrogen and in which the refrigerant circulated through said heat exchanger and then into said chamber is nitrogen.

References Cited

UNITED STATES PATENTS

| | | | |
|---|---|---|---|
| 2,080,103 | 5/1937 | Zarotschenzeff | 62—375 |
| 3,287,932 | 11/1966 | Schlemmer, Jr. | 62—65 |
| 3,425,237 | 2/1969 | McLeese | 62—63 |
| 2,437,492 | 3/1948 | Allen | 165—120 X |

FOREIGN PATENTS

| | | | |
|---|---|---|---|
| 520,156 | 10/1919 | France | 62—514 |

MEYER PERLIN, Primary Examiner

R. C. CAPOSSELA, Assistant Examiner

U.S. Cl. X.R.

62—374, 380, 514

PO-1050
(5/69)

UNITED STATES PATENT OFFICE
CERTIFICATE OF CORRECTION

Patent No. 3,611,745      Dated October 12, 1971

Inventor(s) Alfred H. Schlemmer

It is certified that error appears in the above-identified patent and that said Letters Patent are hereby corrected as shown below:

Column 3, line 20, "includes" is misspelled.
Column 4, line 25, "appreciated" is misspelled;
Same column, line 42, (Claim 1, line 10) after "direct" insert -- contact --.

Signed and sealed this 2nd day of May 1972.

(SEAL)
Attest:

EDWARD M. FLETCHER, JR.      ROBERT GOTTSCHALK
Attesting Officer      Commissioner of Patents